(12) United States Patent
Danielson et al.

(10) Patent No.: US 10,741,103 B2
(45) Date of Patent: Aug. 11, 2020

(54) QUICK CONNECT FLUID CONNECTOR WITH TUBE VARIATION TOLERANCE AND CONNECTION VERIFICATION

(71) Applicant: FasTest, Inc., Roseville, MN (US)

(72) Inventors: Robert Danielson, Roseville, MN (US); Christopher Wagner, Roseville, MN (US); Jake Clifton, Roseville, MN (US)

(73) Assignee: FasTest, Inc., Roseville, MN (US)

(*) Notice: Subject to any disclaimer, the term of this patent is extended or adjusted under 35 U.S.C. 154(b) by 0 days.

(21) Appl. No.: 16/398,996

(22) Filed: Apr. 30, 2019

(65) Prior Publication Data

US 2019/0333420 A1    Oct. 31, 2019

Related U.S. Application Data

(60) Provisional application No. 62/664,600, filed on Apr. 30, 2018.

(51) Int. Cl.
*G09F 3/03* (2006.01)
*F16L 37/12* (2006.01)
*F16L 37/23* (2006.01)

(52) U.S. Cl.
CPC ........ *G09F 3/0335* (2013.01); *F16L 37/1235* (2013.01); *F16L 37/23* (2013.01)

(58) Field of Classification Search
CPC ..... G09F 3/0335; F16L 37/1235; F16L 37/23; F16L 37/122; F16L 37/20
See application file for complete search history.

(56) References Cited

U.S. PATENT DOCUMENTS

| 4,884,830 | A |   | 12/1989 | Meisinger |
|---|---|---|---|---|
| 4,921,284 | A | * | 5/1990 | Singeetham ........ F16L 19/0231 285/114 |
| 5,123,447 | A | * | 6/1992 | Calvin .................... F16L 37/23 137/614.03 |
| 5,947,532 | A | * | 9/1999 | Lorenz ................ F16L 37/0925 285/321 |
| 6,035,894 | A |   | 3/2000 | Weh et al. |
| 6,649,829 | B2 | * | 11/2003 | Garber .................. B67D 7/348 137/177 |

(Continued)

FOREIGN PATENT DOCUMENTS

| EP | 0877192 | 11/1998 |
|---|---|---|
| WO | 2017/053712 | 3/2017 |

OTHER PUBLICATIONS

International Search Report and Written Opinion, issued in the corresponding PCT application No. PCT/IB2019/053543, dated Aug. 27, 2019, 12 pages.

*Primary Examiner* — Adnan Aziz
(74) *Attorney, Agent, or Firm* — Hamre, Schumann, Mueller & Larson, P.C.

(57) ABSTRACT

A quick connect fluid connector that is provided with sealing and gripping feature that are able to tolerate variations in a tube of a second fluid system to which the fluid connector connects. The fluid connector tolerates the variations while maintaining the sealing and gripping at high fluid pressures through the fluid connector. In one embodiment, the fluid connector may also be provided with an RFID tag to verify that the fluid connector is properly connected to the tube.

12 Claims, 12 Drawing Sheets

(56) References Cited

U.S. PATENT DOCUMENTS

| | | | |
|---|---|---|---|
| 7,658,131 B1* | 2/2010 | Rosa | B25B 29/02 |
| | | | 81/57.38 |
| 2008/0080943 A1* | 4/2008 | Bernhard | B23B 31/261 |
| | | | 409/233 |
| 2008/0185837 A1 | 8/2008 | Danielson | |
| 2011/0005639 A1* | 1/2011 | Weh | F16L 37/121 |
| | | | 141/311 R |
| 2013/0174928 A1* | 7/2013 | Danielson | F16L 37/1215 |
| | | | 137/798 |
| 2014/0202710 A1* | 7/2014 | Hales | E21B 19/16 |
| | | | 166/377 |
| 2016/0369922 A1* | 12/2016 | Blake | F16L 33/025 |
| 2017/0089496 A1* | 3/2017 | Lennon | G01M 5/0083 |
| 2018/0371840 A1* | 12/2018 | Cummins | E21B 7/20 |
| 2019/0301648 A1* | 10/2019 | Leckner | F16L 37/084 |
| 2020/0074260 A1* | 3/2020 | Puvogel | G06K 19/07758 |

* cited by examiner

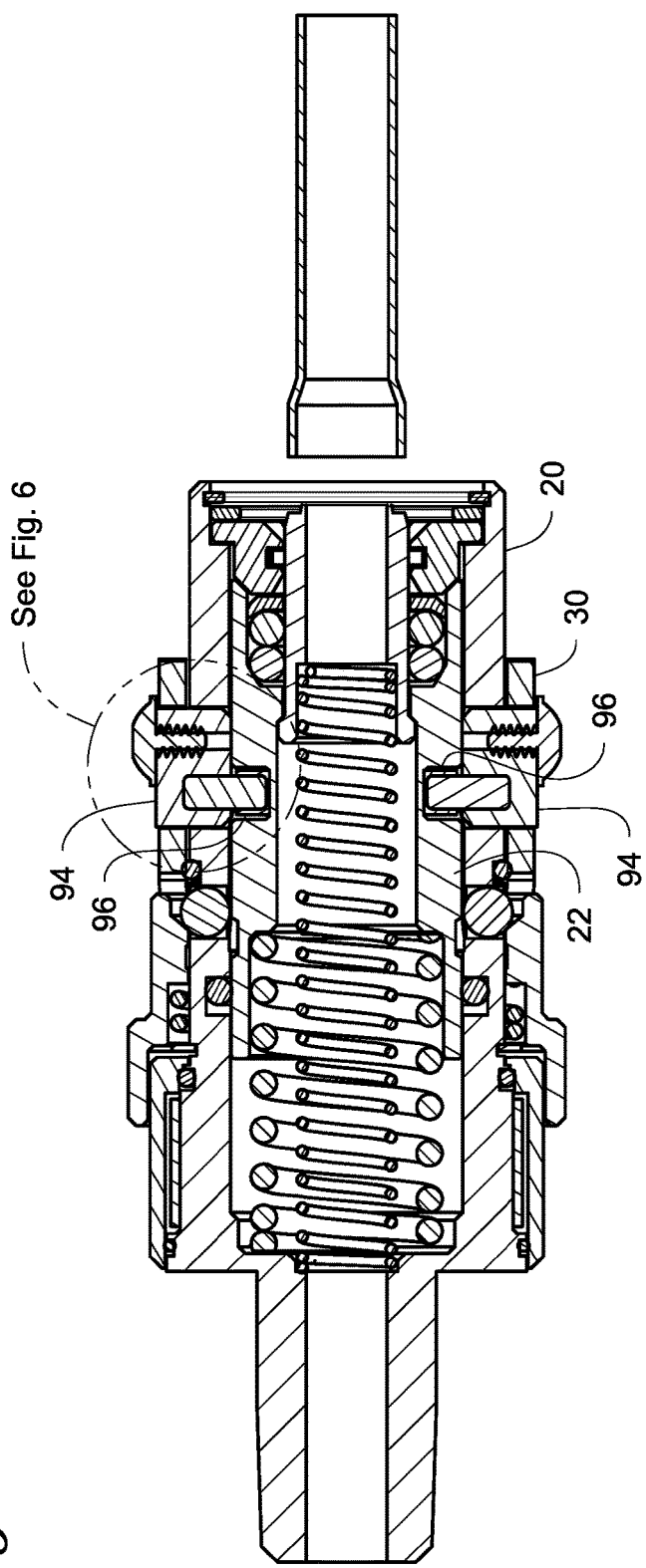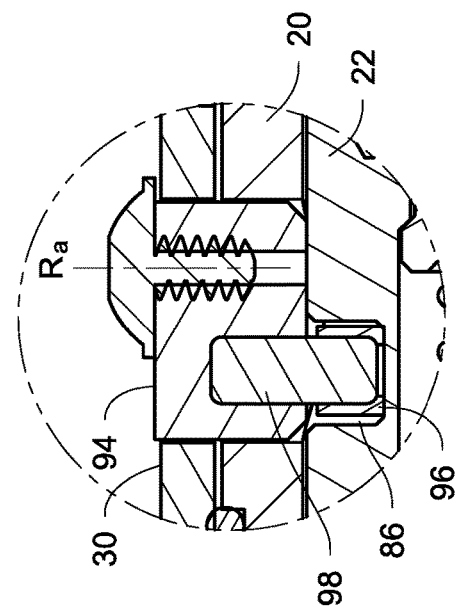

QUICK CONNECT FLUID CONNECTOR WITH TUBE VARIATION TOLERANCE AND CONNECTION VERIFICATION

FIELD

This disclosure relates to a quick connect fluid connector that can be used to, for example, connect a first fluid system with a second fluid system for transferring gases, liquids and other fluids between the first and second fluid systems.

BACKGROUND

Quick connect fluid connectors are commonly used to connect a first fluid system with a second fluid system for transferring fluids between the two fluid systems. Many examples of quick connect fluid connectors are known including those disclosed in U.S. Pat. No. 4,884,830.

It is generally desirable to ensure connection and sealing of the quick connect fluid connector to the fluid system being connected to prior to any fluid being allowed to flow in order to prevent fluid leakage from the quick connect fluid connector and to prevent the quick connect fluid connector from disconnecting while under pressure.

SUMMARY

A quick connect fluid connector is described that is provided with sealing and gripping feature that are able to tolerate variations in a tube of a second fluid system to which the fluid connector connects. The fluid connector tolerates the variations while maintaining the sealing and gripping at high fluid pressures through the fluid connector. In one embodiment, the fluid connector described herein may also be provided with a verification means to verify that the fluid connector is properly connected to the tube.

In one embodiment, the verification means can be an RFID tag mounted on the fluid connector at a location whereby the presence of the RFID tag cannot be sensed or detected when the fluid connector is not properly attached to the tube of the second fluid system. The RFID tag can only be sensed when the fluid connector has been properly attached to the tube. Therefore, failure to sense the RFID tag can indicate to an operator that the fluid connector has not been properly attached and a flow of fluid in a processing operation through the fluid connector can be prevented until such time that the fluid connector is properly attached and the RFID tag is sensed.

In the quick connect fluid connectors described herein, the piston at least partially surrounds the collets and actuates the collets. This differs from conventional quick connect fluid connector designs where the collets are typically actuated by a movable sleeve or a body of the connector.

In the quick connect fluid connectors described herein, the position piston limits radial inward extrusion of the seal. In particular, at the retracted position of the piston and at the retracted position of the position piston and with the quick connect fluid connector connected to the tube, the seal is encapsulated at a radially inner side thereof by the position piston and the tube, at a radially outer side thereof by the piston, at one axial end thereof by the piston and at a second axial end thereof by an element such as a washer. During operation of the fluid connector, the seal is axially squeezed between the piston and the element. However, the position piston and the outer diameter of the tube limit the radial inward extrusion of the seal as the seal is being axially squeezed.

In one embodiment, a quick connect fluid connector is described that is detachably connectable to a tube of a fluid system to process a fluid into or from the fluid system through the quick connect fluid connector. The fluid connector is a generally cylindrical construction that can include a body, a piston, a position piston, a collet assembly with a plurality of collets, a locking sleeve, and a longitudinal axis. The body has a first end and a second end, and defines an interior space. The locking sleeve surrounds the body and is slidably disposed on the body for sliding movement parallel to the longitudinal axis between a retracted position and a forward position, and a spring is engaged with the locking sleeve and biases the locking sleeve toward the forward position. The collet assembly is disposed within the interior space of the body adjacent to the second end thereof. The plurality of collets are movable between an expanded position and a collapsed position, the plurality of collets are at the collapsed position when the locking sleeve is at the forward position. The piston is slidably disposed within the interior space of the body for sliding movement parallel to the longitudinal axis between a retracted position and a forward position, a spring is engaged with the piston and biases the piston toward the forward position of the piston, and the piston has a first end and a second end. At the retracted position of the piston, the plurality of collets are at the expanded position, and at the forward position of the piston the second end of the piston surrounds the plurality of collets and the plurality of collets are at the collapsed position. The position piston is slidably disposed within the piston and the position piston is slidable parallel to the longitudinal axis relative to the piston between a retracted position and a forward position. A spring is engaged with the position piston and biases the position piston toward the forward position thereof, and the position piston has a first end and a second end. At the forward position of the position piston, the plurality of collets are at the expanded position and the second end of the position piston is surrounded by the plurality of collets, and at the retracted position of the position piston the plurality of collets are at the collapsed position and the plurality of collets do not surround the second end of the position piston. In addition, a handle is pivotally connected to the body for pivoting movement between a disconnect position and a connect position. The handle is attached to the piston so as to actuate the piston when the handle pivots between the disconnect position and the connect position, the piston being at the retracted position thereof when the handle is at the disconnect position and the piston being at the forward position thereof when the handle is at the connect position.

In another embodiment, a quick connect fluid connector is described that is detachably connectable to a tube of a fluid system to process a fluid into or from the fluid system through the quick connect fluid connector. The fluid connector is a generally cylindrical construction that can include a body, a piston, a position piston, a collet assembly with a plurality of collets, a locking sleeve, and a longitudinal axis. The locking sleeve surrounds the body and is slidably disposed on the body for sliding movement parallel to the longitudinal axis between a retracted position and a forward position, and a spring is engaged with the locking sleeve and biases the locking sleeve toward the forward position. In addition, at least one radio frequency identification tag, either a passive tag or an active tag, is attached to an outer surface of the body. The radio frequency identification tag is positioned at a location on the outer surface of the body such that at least a portion of the radio frequency identification tag is covered by the locking sleeve when the locking sleeve is at the retracted position, and no portion of the radio frequency identification tag is covered by the locking sleeve when the locking sleeve is at the forward position.

In still another embodiment, a quick connect fluid connector is described that is detachably connectable to a tube of a fluid system to process a fluid into or from the fluid system through the quick connect fluid connector. The fluid connector is a generally cylindrical construction that includes a body. A part is mounted on the body and is movable relative to the body between a first position and a second position. At least one radio frequency identification tag, either a passive tag or an active tag, is attached to an outer surface of the body. The radio frequency identification tag is positioned at a location on the outer surface of the body such that at least a portion of the radio frequency identification tag is covered by the part when the part is at the first position, and no portion of the radio frequency identification tag is covered by the part when the part is at the second position.

In still another embodiment, a method of verifying connection of a quick connect fluid connector to a tube of a fluid system to process a fluid into or from the fluid system through the quick connect fluid connector is described. The method includes attaching at least one radio frequency identification tag, either a passive tag or an active tag, to an outer surface of a body of the quick connect fluid connector at a location whereby the at least one radio frequency identification tag cannot be detected by an electronic reader when the quick connect fluid connector is at a disconnected state and the at least one radio frequency identification tag can be detected by the electronic reader when the quick connect fluid connector is at a connected state.

DRAWINGS

FIG. 5 is another cross-sectional side view of the quick connect fluid connector and the tube taken 90 degrees from the view in FIG. 3.

FIG. 6 is a close-up view of the portion contained in the circle 6 in FIG. 5.

DETAILED DESCRIPTION

Figure 1:
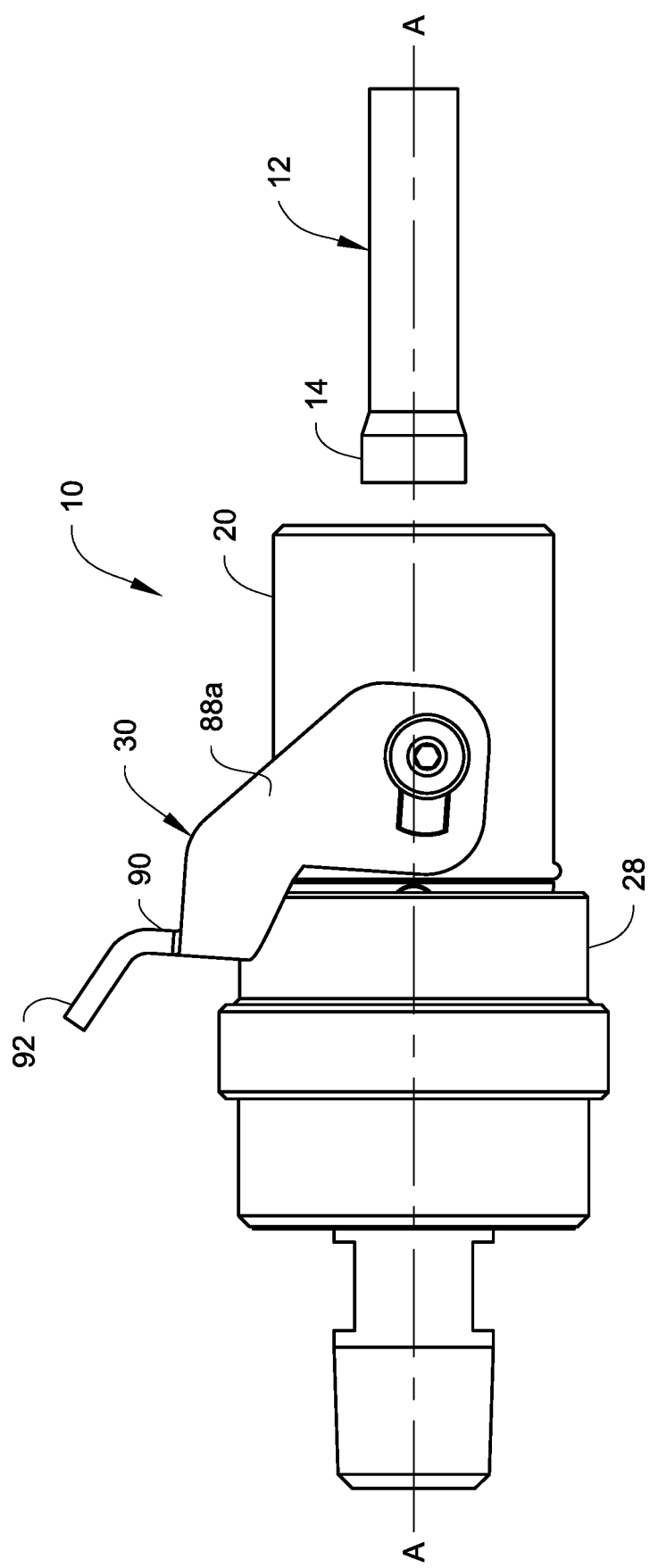
FIG. 1 is a side view of a quick connect fluid connector described herein prior to connection to a tube of a fluid system.
Figure 2:
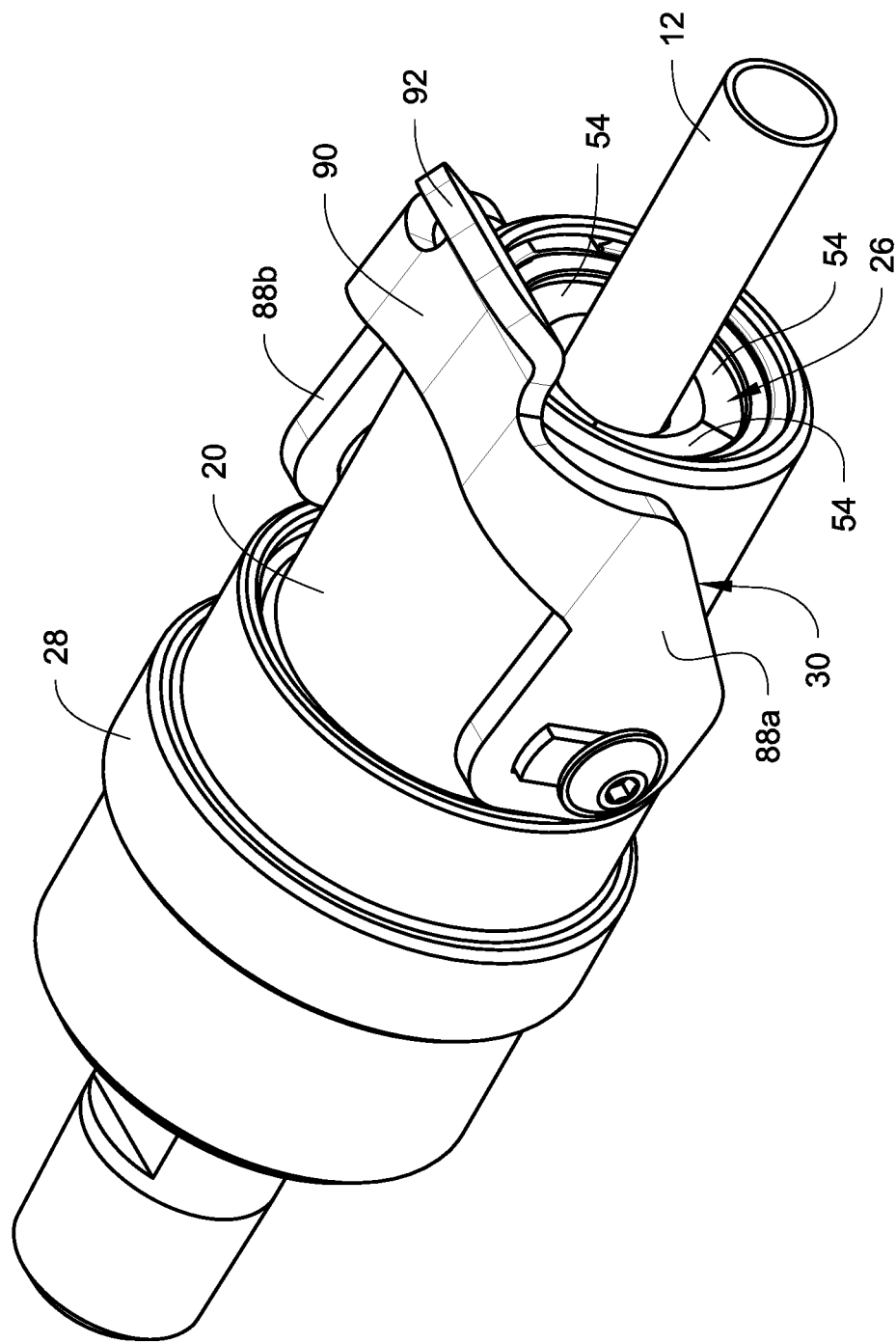
FIG. 2 is a perspective view with the quick connect fluid connector of FIG. 1 connected to the tube.

Referring initially to FIGS. 1-2, an embodiment of a quick connect fluid connector 10 is illustrated. In this example, the fluid connector 10 is a generally cylindrical construction with a longitudinal axis A-A. The fluid connector 10 can be used to, for example, fluidly connect a first fluid system (not shown) with a tube 12 of a second fluid system for transferring fluids, including gaseous or liquid fluids, between the first and second fluid systems, or the fluid connector 10 can connect to the tube 12 of the second fluid system for sealing the second fluid system using the fluid connector 10.

In the illustrated example, the tube 12 has a flared or expanded end 14 that is flared or expanded radially outwardly so that the diameter of the flared end 14 is greater than the diameter of the rest of the tube 12. As described in more detail below, the fluid connector 10 is designed to seal with and grip on the tube 12. In addition, the fluid connector 10 is designed to accommodate variations in the tube 12 and the flared end 14 thereof. In addition, in some embodiments, the fluid connector 10 can be provided with a means to verify that the fluid connector 10 is properly connected to the tube 12.

Referring to FIGS. 1-4, fluid connector 10 includes a body 20 (FIGS. 1-4), a piston 22 (FIGS. 3-4), a position piston 24 (FIGS. 3-4), a collet assembly 26 (FIGS. 2-4), a locking sleeve 28 (FIGS. 1-4), and a handle 30 (FIGS. 1-4). The body 20, the piston 22, the position piston 24, the collet assembly 26 and the locking sleeve 28 are each generally cylindrical.

The body 20 is a generally elongated, generally cylindrical structure that surrounds the piston 22, the position piston 24 (which is surrounded by the piston 22), and the collet assembly 26. The body 20 has a first or rear end 32 and a second or front end 34, and defines an interior space 36 for receiving the piston 22, the position piston 24 and the collet assembly 26. The first end 32 is connectable to tubing or other structure of the first fluid system, and fluid flowing through the fluid connector 10 can flow from or into the tubing via the interior space 36, the piston 22, and the position piston 24.

Figure 3:
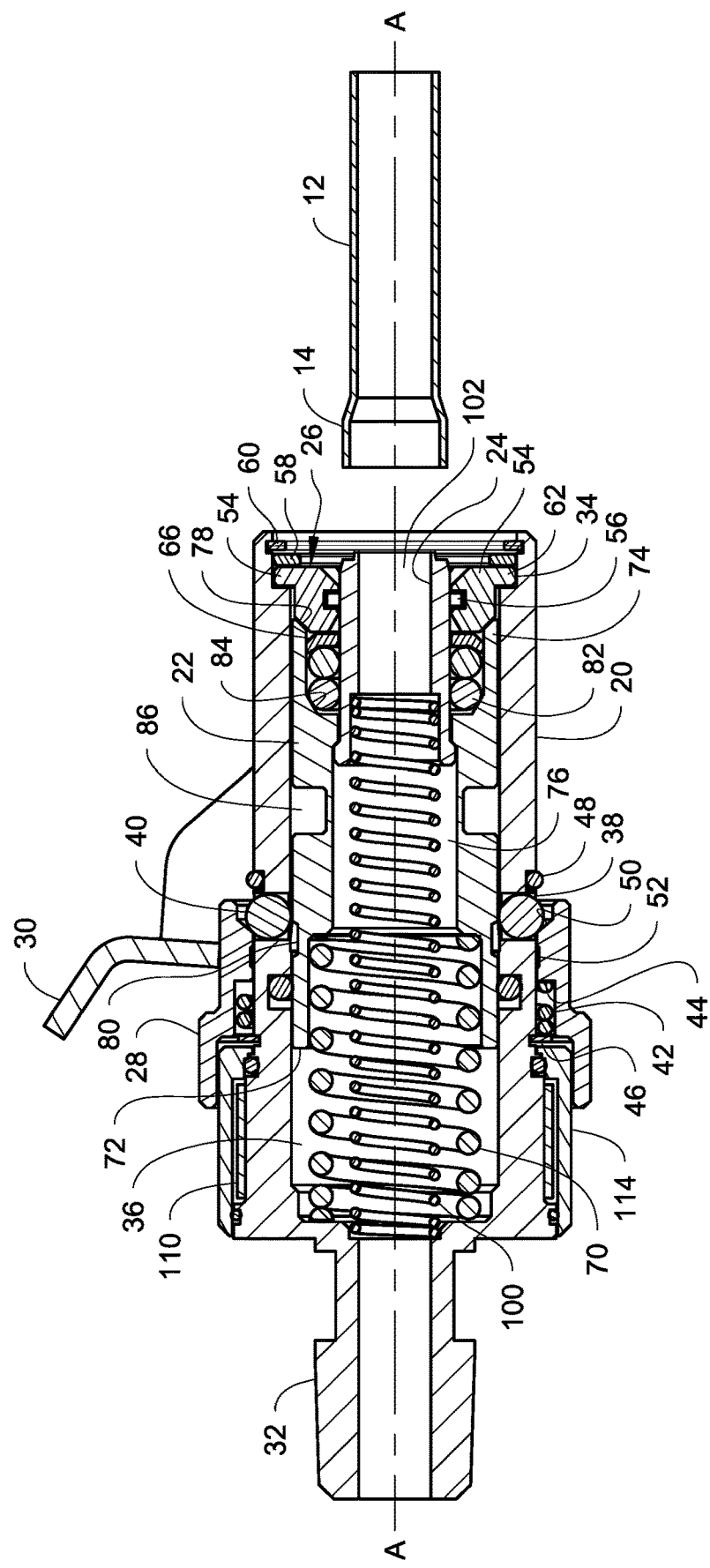
FIG. 3 is a cross-sectional side view of the quick connect fluid connector and the tube.
Figure 4:
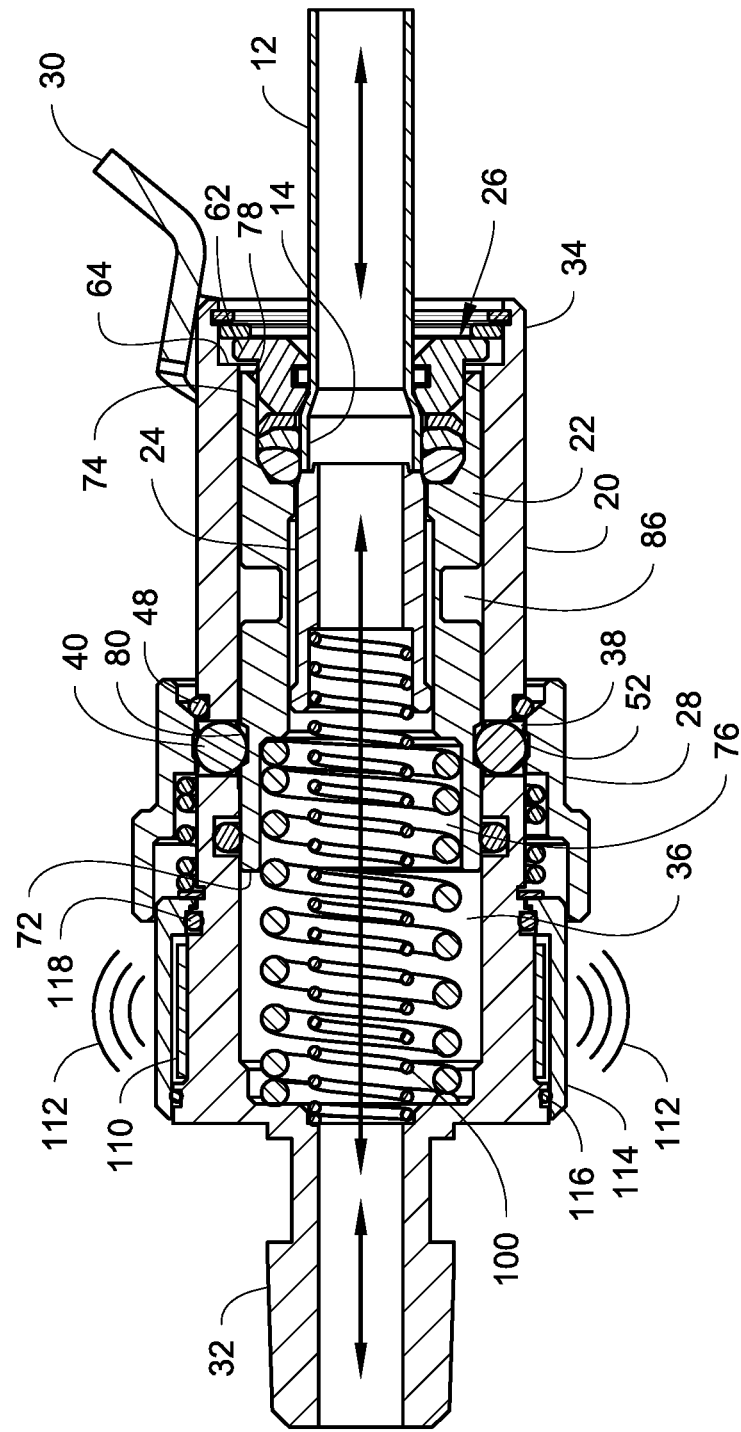
FIG. 4 is a cross-sectional side view of the quick connect fluid connector connected to the tube.

Referring to FIGS. 3 and 4, the body 20 further includes a plurality of circumferential spaced holes 38 each of which receives a locking ball 40. The locking balls 40 are used to lock the position of the locking sleeve 28 as described further below.

With continued reference to FIGS. 3 and 4, the locking sleeve 28 is a generally cylindrical structure that surrounds the body 20. The locking sleeve 28 is slidably disposed on the body 20 for sliding movement parallel to the longitudinal axis A-A between a retracted position (FIG. 3) and a forward position (FIG. 4). A biasing mechanism, such as a coil spring 42, is engaged with the locking sleeve 28 and biases the locking sleeve 28 toward the forward position. The coil spring 42 has a front end engaged with a shoulder 44 defined on the locking sleeve 28, and a rear end engaged with a snap ring 46 fixed around the body 20. Forward travel of the locking sleeve 28 on the body 20 is limited by a snap ring 48 (or other structure) disposed on the body 20.

As best seen in FIGS. 3-4, the locking sleeve 28 defines an inner ramp surface 50 near a forward end thereof, and a detent groove 52 to the rear of the ramp surface 50. At the retracted position in FIG. 3, the ramp surface 50 is adjacent to the locking balls 40. The detent groove 52, which can be circumferentially continuous, is intended to receive radially outer ends of the locking balls 40 at the forward position of the locking sleeve 28. In use of the fluid connector 10 as discussed further below, the ramp surface 50 pushes the balls 40 radially inward as the locking sleeve 28 moves toward the forward position. When the balls 40 are pushed inward, the locking sleeve 28 can slide over the locking balls 40 to the forward position where the radially outer ends of the locking balls 40 sit within the detent groove 52 (FIG. 4) to releasably lock the locking sleeve 28 at the forward position.

Referring to FIGS. 2-4, the collet assembly 26 is disposed within the interior space 36 of the body 20 adjacent to the second end 34 thereof. The collet assembly 26 includes a plurality of individual collets 54 arranged in a circle around the longitudinal axis A-A. The collets 54 are configured so as to be movable radially during operation of the fluid connector 10 between an expanded position (FIG. 3) where the collets 54 define a first diameter and a collapsed position (FIG. 4) where the collets 54 define a second diameter that is less than the first diameter. The motion of the collets 54 is radial (inward or outward) only; the collets 54 do not pivot. The collets 54 are biased to the expanded position by a spring ring 56 that is disposed around the position piston 24 and disposed within a circumferential channel defined by the inner surfaces of the collets 54. The collets 54 are held within the interior space 36 of the body 20 by a washer 58 and a snap ring 60 that retains the washer 58 in the body 20. Each of the collets 54 has a radial flange 62 extending therefrom, with the flange 62 being disposed between the washer 58 and a shoulder 64 defined on the interior surface of the body 20 when the collets 54 are at the expanded position. In addition, a washer 66 is disposed at the opposite sides of the collets 54 so that the collets 54 are axially fixed between the washers 58, 66, with the washer 66 contained within the inner diameter of the piston 22. During operation of the fluid connector 10, the collets 54 are forced radially inward by the piston 22 from the expanded position in FIG. 3 to the collapsed position in FIG. 4. As best seen in FIG. 4, the collets 54 are at the collapsed position when the locking sleeve 28 is at the forward position.

Referring to FIGS. 3 and 4, the piston 22 is slidably disposed within the interior space 36 of the body 20 for sliding movement relative to the body 20 in directions parallel to the longitudinal axis A-A between a retracted position (FIG. 3) and a forward position (FIG. 4). A biasing mechanism, such as a coil spring 70, is engaged with the piston 22 and biases the piston 22 toward the forward position in FIG. 4. The spring 70 has a front end engaged with a shoulder defined on the interior of the piston 22, and a rear end engaged with an interior shoulder defined on the body 20.

The piston 22 is generally hollow and has a first or rear end 72, a second or front end 74, and a passage 76 extending longitudinally therethrough. The first end 72 receives the front end of the spring 70 therein. The second end 74 includes an angled ramp surface 78 that is engageable with a corresponding angled ramp surface defined on the collets 54 at the retracted position of the piston 22 shown in FIG. 3. At the retracted position of the piston 22, the collets 54 are at their expanded position. As the piston 22 is actuated toward the forward position in FIG. 4 (and the position piston 24 is moved out of the way as described further below), the ramp surface 78 engages the ramp surface on the collets 54, forcing the collets 54 radially inward to their collapsed position and the second end 74 of the piston 22 is up and over the collets 54, surrounding the collets 54 to retain the collets 54 at the collapsed position and preventing the collets 54 from moving radially outward to return to the expanded position. So in the fluid connector 10, the collets 54 are actuated by the piston 22. In prior fluid connectors, the collets are encompassed by and actuated by either the sleeve or the body of the fluid connector.

The piston 22 further includes a detent groove 80 formed in the exterior surface thereof between the first end 72 and the second end 74, but positioned closer to the first end 72 than to the second end 74. The detent groove 80, which can be circumferentially continuous, is intended to receive radially inner ends of the locking balls 40 at the forward position of the piston 22 and the forward position of the locking sleeve 28 as illustrated in FIG. 4. In use of the fluid connector 10 as discussed further below, the radially outer ends of the locking balls 40 sit within the detent groove 52 of the locking sleeve 28 while the radially inner ends of the locking balls 40 sit within the detent groove 80 of the piston 22 (FIG. 4) at the connected state of the fluid connector 10.

With continued reference to FIGS. 3-4, the second end 74 of the piston 22 receives a sealing assembly 82 therein. The sealing assembly 82 is disposed between an interior shoulder 84 defined on the interior of the piston 22 and the washer 66. In operation of the fluid connector 10, the sealing assembly 82 is designed to be squeezed between the washer 66 and the shoulder 84 as the piston 22 moves to its forward position in FIG. 4. Since the sealing assembly 82 is effectively encapsulated outwardly as well as axially, the sealing assembly 82 extrudes radially inwardly as it is being squeezed. This causes the sealing assembly 82 to seal with the outer diameter of the flared end 14 of the tube 12 and come into contact (but not necessarily seal) with the outer diameter of the front end of the position piston 24 (as shown in FIG. 4) to prevent fluid leakage and limit radial inward extrusion of the sealing assembly 82. Because the sealing assembly 82 engages with the outer diameter of the position piston 24 and the sealing assembly 82 is encapsulated between the outer diameter of the position piston 24, the inner diameter of the piston 22, the outer diameter of the flared end 14 of the tube 12, the washer 66 and the shoulder 84 of the piston 22, extrusion of the sealing assembly 82 when being squeezed is limited, resulting in a consistent sealing force and longer life for the sealing assembly 82.

Figure 9:
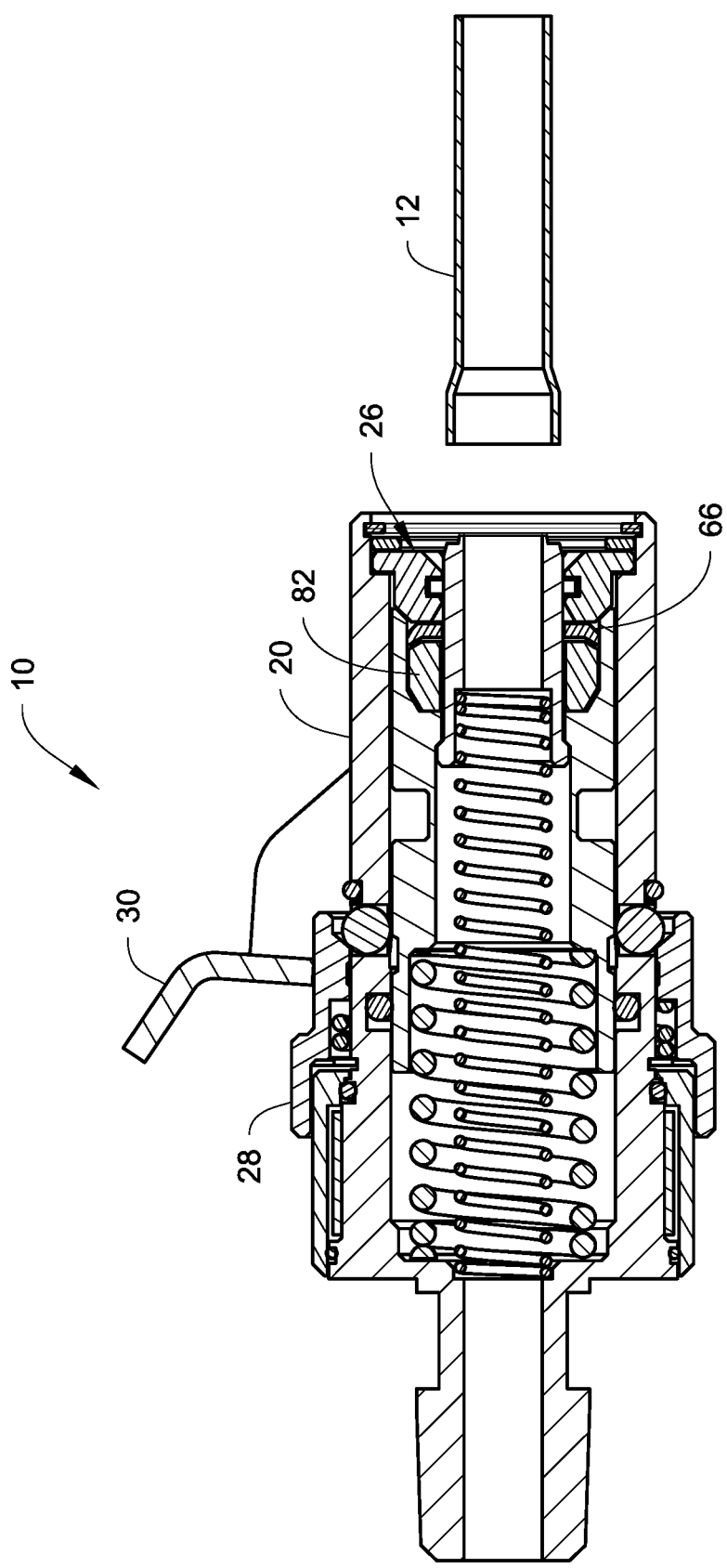
FIG. 9 illustrates an embodiment of a fluid connector with a one-piece seal assembly.

The sealing assembly 82 can have any construction that allows it to perform the sealing functions described herein. In one embodiment, the sealing assembly 82 can be a pair of side-by-side elastomeric o-rings (as illustrated in FIGS. 3-5 and 7) where the o-rings are separate from one another or are integrated together into a unitary single-piece construction. In another embodiment illustrated in FIG. 9, the sealing assembly 82 can be a single, unitary elastomeric element.

Referring to FIGS. 3-7, together with FIGS. 1-2, the piston 22 further includes a cam channel 86 formed in the exterior surface thereof. The cam channel 86 can be circumferentially continuous and receives therein part of an actuation mechanism that is connected to the handle 30 for actuating the piston 22 between the retracted and forward positions thereof. In particular, the handle 30 is pivotally connected to the body 20 so that the handle 30 is pivotable relative to the body 20 between a disconnect position (shown in FIGS. 1 and 3) and a connect position (shown in FIGS. 2 and 4). At the disconnect position of the handle 30, the piston 22 is in the retracted position, while the piston 22 is at the forward position when the handle 30 is at the connect position.

The handle 30 can have any construction that allows the handle 30 to be actuated between the disconnect and connect positions, and actuate the piston 22 as the handle 30 moves between these position. In the embodiment illustrated in FIGS. 1-2, the handle 30 is illustrated as including a pair of arms 88a, 88b disposed on opposite sides of the body 20, with a central member 90 connecting the arms 88a, 88b. The central member 90 includes an angled finger lift section 92 by which a user can actuate the handle 30 between the disconnect and connect positions.

Figure 7:
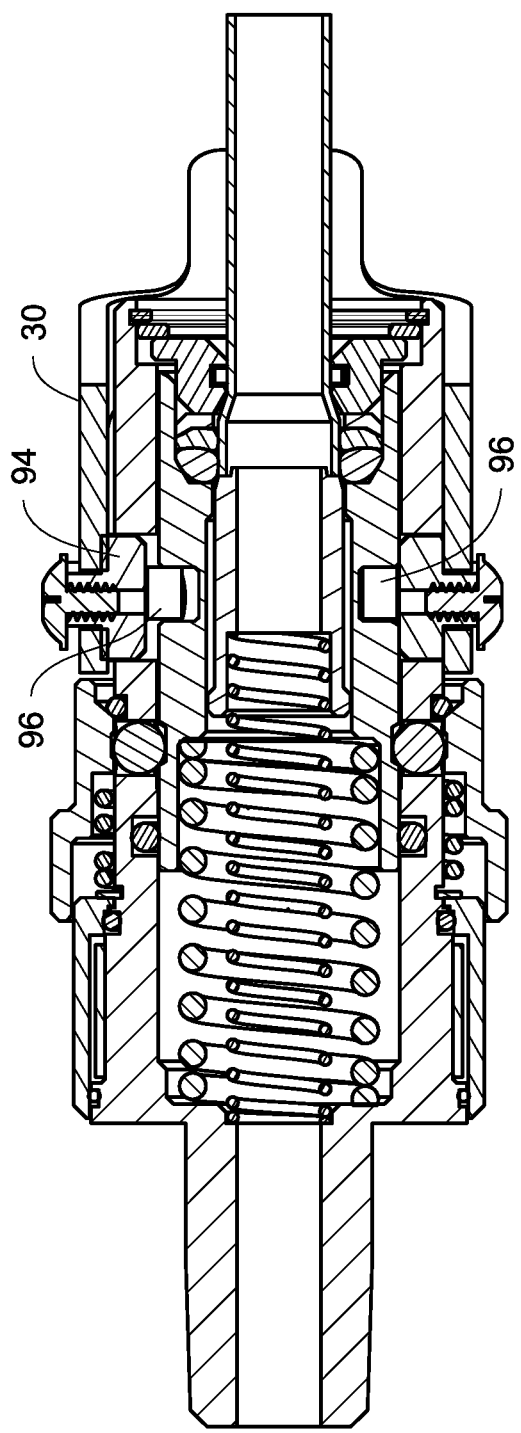
FIG. 7 is a cross-sectional side view similar to FIG. 5 but with the quick connect fluid connector connected to the tube.

Referring to FIGS. 5-7, a cam 94 is fixed to each one of the arms 88a, 88b and rotate therewith about a rotation axis Ra. A cam follower or bushing 96 is fixed to each one of the cams 94, for example by a pin 98, at a location offset from the rotation axis Ra so that the cam follower 96 rotates about the rotation axis Ra. The cam followers 96 are disposed within the cam channel 86 of the piston 22 so that as the cams 94 are rotated by the handle 30, the cam followers 96 move from the position shown in FIGS. 5-6 to the position shown in FIG. 7. In operation, as the handle 30 rotates from the disconnect position in FIGS. 1 and 3 to the connect position in FIGS. 2 and 4, the cams 94 rotate with the handle 30. This rotates the off-center cam followers 96 disposed in the cam channel 86 thereby driving the piston 22 from the retracted position to the forward position. When the handle 30 is rotated from the connect position back to the disconnect position, the piston 22 is driven back to the retracted position.

The position piston 24 controls the radial inward movement of the collets 54 which in turn controls movement of the piston 22 to the forward position which in turn controls radially inward movement of the locking balls 40 to permit the locking sleeve 28 to move to the forward position. The position piston 24 is slidably disposed within the piston 22 and the position piston 22 is slidable relative to the piston 22 parallel to the longitudinal axis A-A between a retracted position (FIG. 4) and a forward position (FIG. 3). At the forward position of the position piston 24, the position piston 24 is within the collets 54 preventing movement of the collets 54 to the collapsed position. In order for the collets 54 to move radially inward to the collapsed position, the position piston 24 must be moved to the retracted position.

Referring to FIGS. 3-4, a biasing mechanism, such as a coil spring 100, is engaged with the position piston 24 and biases the position piston 24 toward the forward position in FIG. 4. The spring 100 has a front end engaged with a shoulder defined on the interior of the position piston 24, and a rear end engaged with an interior shoulder defined on the body 20. The spring 100 is coaxially disposed within the spring 70.

The position piston 24 has a first end engaged with the spring 100, a second end opposite the first end, and a fluid passageway 102 extending between the first end and the second end. The second end of the position piston 24 is configure to engage with the flared end 14 of the tube 12 as shown in FIG. 4. In particular, the second end of the position piston 24 has an outer diameter that is approximately equal to the outer diameter of the flared end 14 so that the outer diameter of the second end of the position piston 24 effectively forms a continuation of the flared end 14.

Operation of the fluid connector 10 should be apparent from the description above. To connect to the tube 12, the flared end 14 of the tube 12 is inserted into the end of the fluid connector 10. This insertion will drive the position piston 24 back to the retracted position (FIG. 4) which will allow the collets 54 to be driven radially inward to the collapsed position against the biasing force of the spring ring 56. The collets 54 are driven radially inward to the collapsed position via the piston 22 being actuated toward the forward position due to mechanical action of the cam followers 96 in the cam channel 86 of the piston 22 by rotation of the handle 30 from the disconnect position to the connect position. When the piston 22 reaches the forward position, the detent groove 80 is disposed underneath the locking balls 40 which will allow the locking balls 40 to be driven radially inward. The locking balls 40 will be automatically driven radially inward by the ramp surface 50 on the locking sleeve 28 via the biasing force of the spring 42 acting on the locking sleeve 28. When the fluid connector 10 is fully connected and while under fluid pressure, the detent groove 52 on the locking sleeve 28 will be radially above the locking balls 40 and the outer ends of the locking balls 40 will be disposed within the detent groove 52 preventing retraction of the locking sleeve 28 to the retracted position. If the position piston 24 is not driven backward by the insertion of the tube 12, then the collets 54 cannot move radially inward, the piston 22 cannot move forward to the forward position, the operator cannot rotate the handle 30 to the connect position to mechanically drive the piston 22 to the forward position, and the locking balls 40 will not move radially inward. The piston 22 prevents the sleeve 28 from moving to the retracted position, due to the detent groove 52 on the sleeve 28 that will prevent the sleeve 28 from being actuated, even when the operator is attempting to move the handle 30 to the disconnect position when the fluid connector 10 is pressurized.

For safety reasons, the piston 22 is a pressure piston which is difficult to move backward when the fluid connector 10 is pressurized. In particular, the pressurized fluid flowing through the fluid connector 10 will act on the piston 22 and tend to force the piston 22 to the right in FIG. 4. This will apply an increased radially upward force on the locking balls 40 to increase the force on the detent groove 52. So the detent groove 52 on the locking sleeve 28 and the detent groove 80 on the piston 22 act to prevent unintended movement of the locking sleeve 28 or the piston 22 when pressurized. The locking balls 40 will be driven into the detent groove 52 of the locking sleeve 28 if the operator attempts to rotate the handle 30 to the disconnect position without first moving the locking sleeve 28 backward to the retracted position. In addition, when pressurized fluid is flowing through the fluid connector, the piston 22 is pressurized and the locking sleeve 28 cannot move to the retracted position because the piston 22 will be driving the locking balls 40 into the detent groove 52 of the locking sleeve 28 and the operator will be unable to overcome this force.

To reverse and remove the tube 12 from the fluid connector 10, the flow of pressurized fluid must be stopped, and then the operator will pull the locking sleeve 28 back to the retracted position and then rotate the handle 30 to the disconnect position which will actuate the piston 22 to the retracted position. The spring ring 56 will automatically separate the collets 54 from the tube 12, and the operator will pull the fluid connector 10 free from the tube 12. Simultaneously, the spring 100 will bias the position piston 24 back to the forward position to maintain the collets 54 at the expanded position waiting for connection to the next tube 12.

Figure 10:
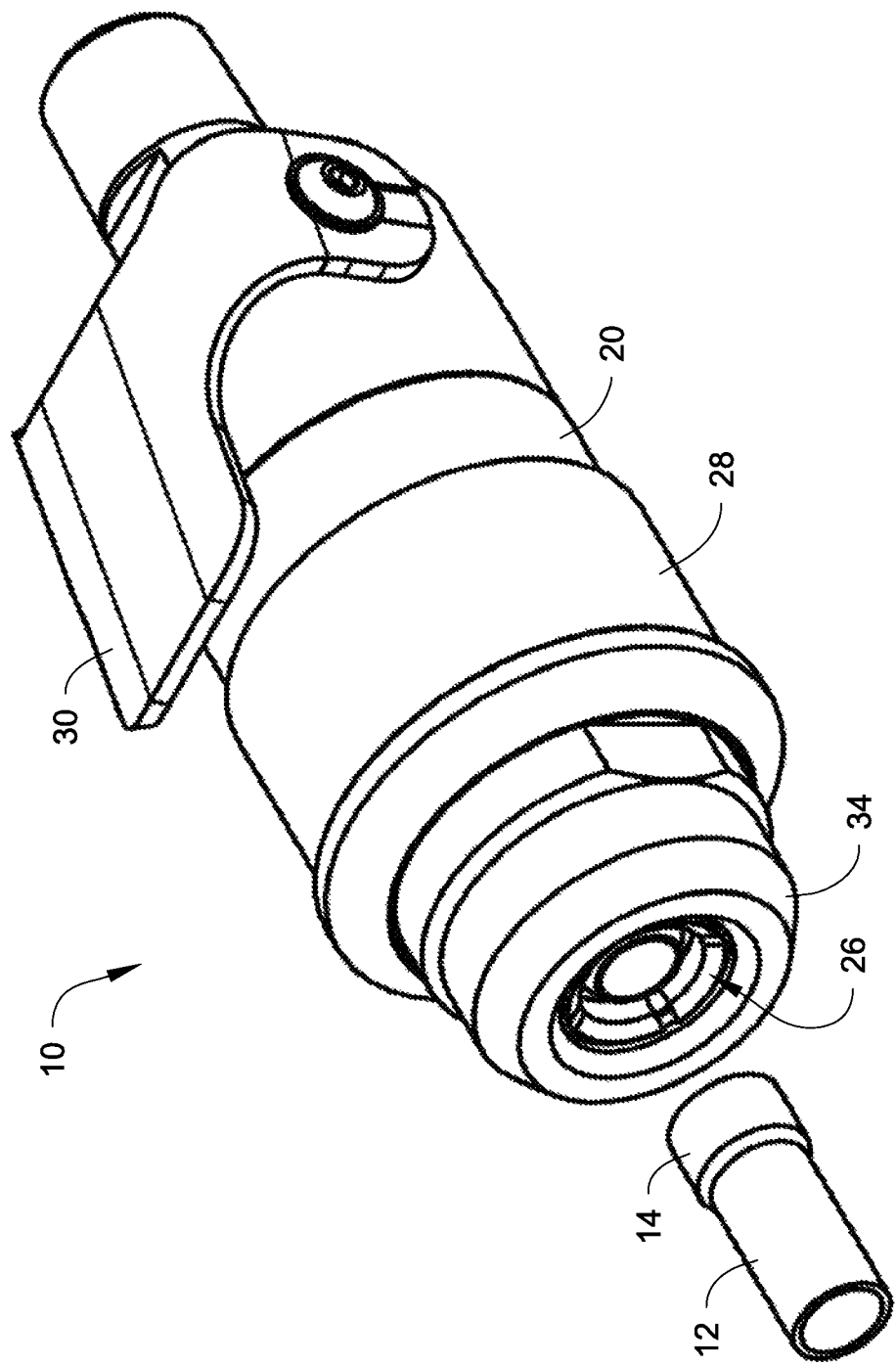
FIG. 10 is a perspective view of another embodiment of a quick connect fluid connector described herein prior to connection to a tube of a fluid system.
Figure 11:
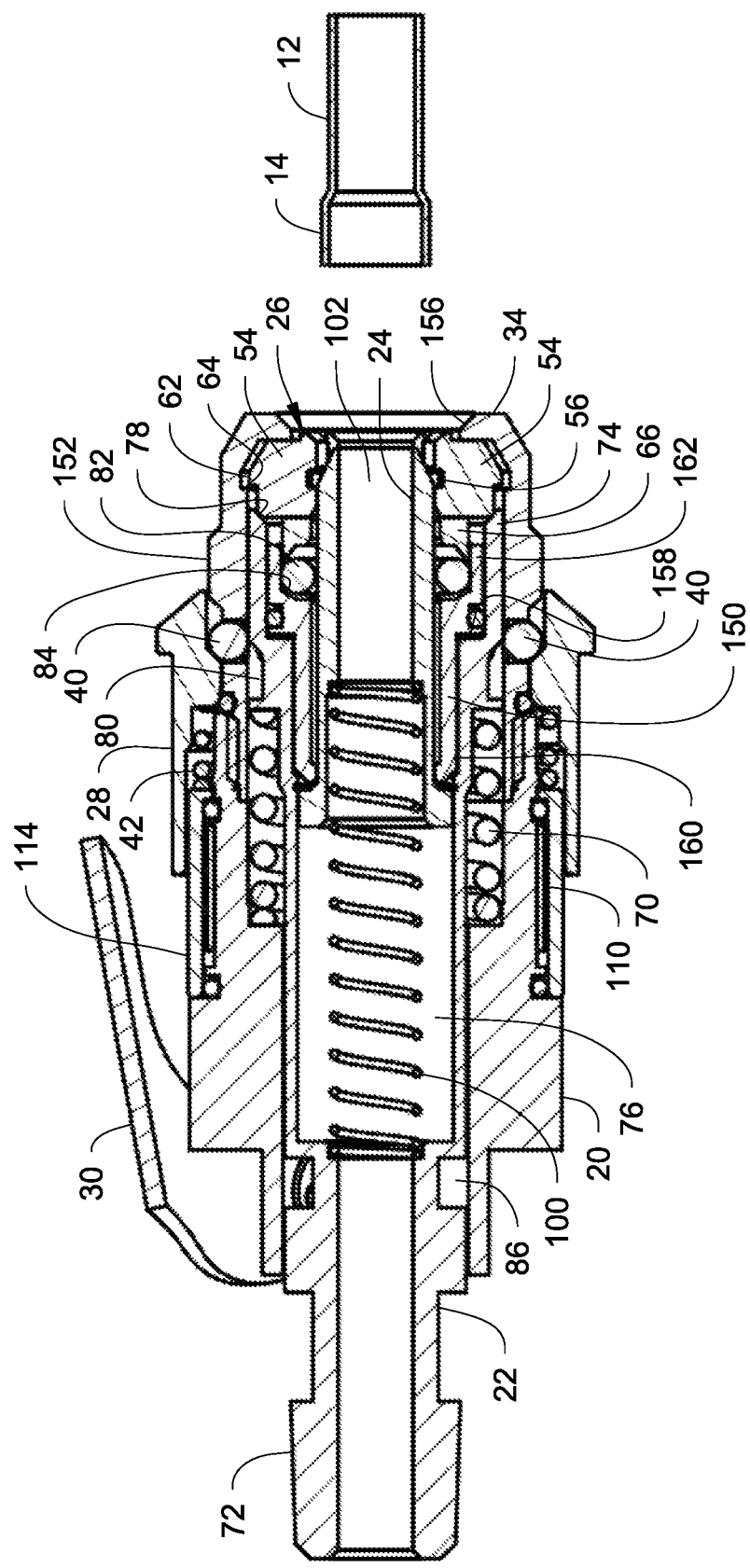
FIG. 11 is a cross-sectional side view of the quick connect fluid connector of FIG. 10 and the tube.
Figure 12:
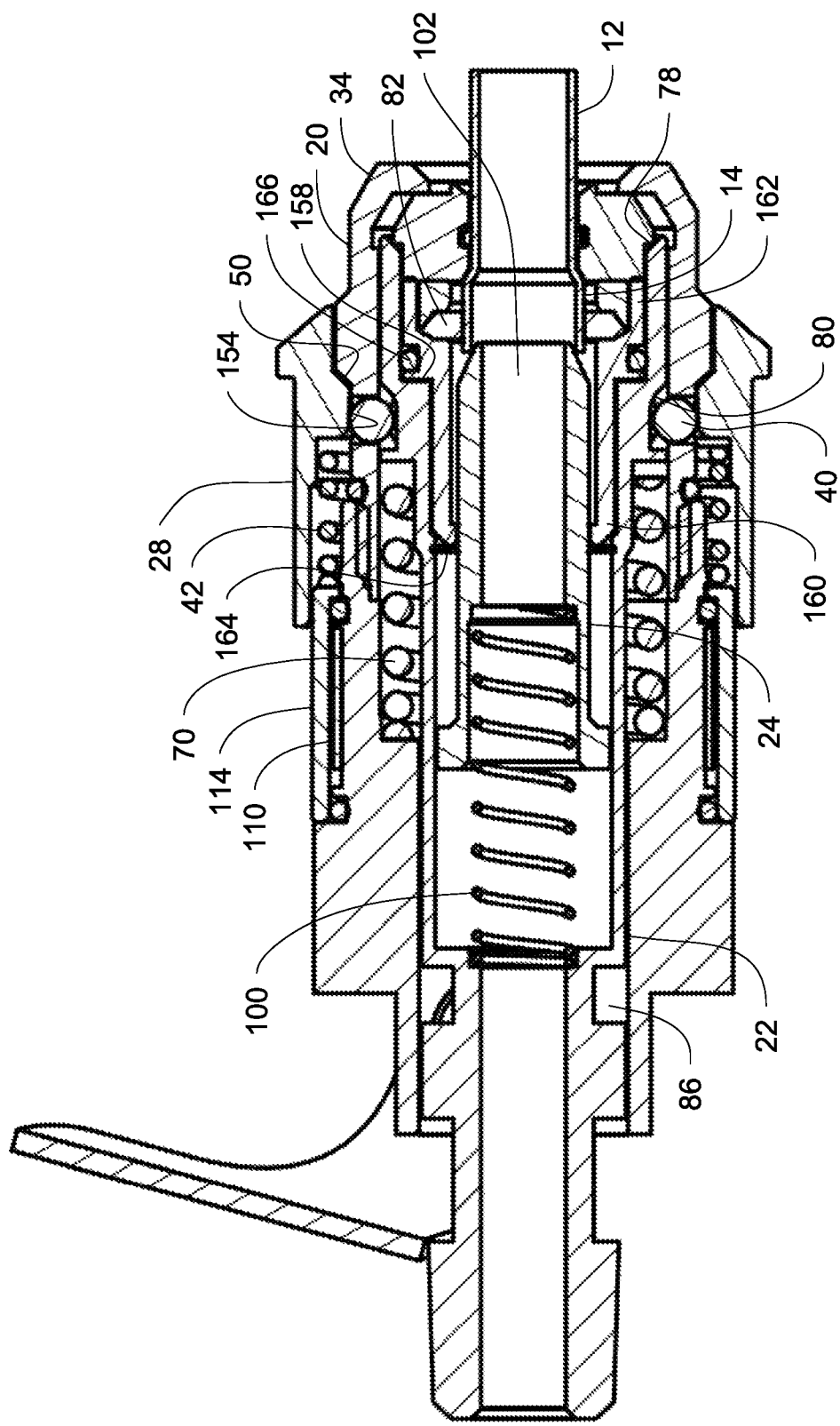
FIG. 12 is a cross-sectional side view of the quick connect fluid connector of FIG. 10 connected to the tube.

FIGS. 10-12 illustrate another embodiment of the quick connect fluid connector 10 that can be used to, for example, fluidly connect the first fluid system (not shown) with the flared end 14 of the tube 12. In this embodiment, elements that are similar to elements in FIGS. 1-7 and 9 are referenced using the same reference numerals.

In this embodiment, the fluid connector 10 includes the body 20 (FIGS. 10-12), the piston 22 (FIGS. 11-12), the position piston 24 (FIGS. 11-12), the collet assembly 26 (FIGS. 10-12), the locking sleeve 28 (FIGS. 10-12), and the handle 30 (FIGS. 10-12). This embodiment of the fluid connector 10 further includes a main seal piston 150 (FIGS. 11-12).

Referring to FIGS. 11 and 12, the body 20 is a generally elongated, generally cylindrical structure that surrounds the piston 22, the position piston 24 (which is surrounded by the piston 22), the main seal piston 150 and the collet assembly 26. The body 20 includes the plurality of circumferential spaced holes 38 each of which receives one of the locking balls 40 that lock the position of the locking sleeve 28 as described further below.

With continued reference to FIGS. 11 and 12, the locking sleeve 28 is a generally cylindrical structure that surrounds the body 20. The locking sleeve 28 is slidably disposed on the body 20 for sliding movement parallel to the longitudinal axis between a retracted position (FIG. 11) and a forward position (FIG. 12). A biasing mechanism, such as the coil spring 42, is engaged with the locking sleeve 28 and biases the locking sleeve 28 toward the forward position. The coil spring 42 has a front end engaged with a shoulder defined on the locking sleeve 28, and a rear end is engaged with the body 20. In this embodiment, forward travel of the locking sleeve 28 on the body 20 is limited by an enlarged diameter portion 152 (or other structure) of the body 20 as best seen in FIG. 12.

As with the locking sleeve 28 in FIGS. 1-7 and 9, the locking sleeve 28 in the embodiment of FIGS. 10-12 has the inner ramp surface 50 near a forward end thereof. At the retracted position in FIG. 11, the ramp surface 50 is adjacent to the locking balls 40. In use of the fluid connector 10 as discussed further below, the ramp surface 50 pushes the balls 40 radially inward as the locking sleeve 28 moves toward the forward position. When the balls 40 are pushed inward, the locking sleeve 28 can slide over the locking balls 40 to the forward position (FIG. 12) where the radially outer ends of the locking balls 40 are engaged with an engagement surface 154 of the locking sleeve 28 to releasably lock the locking sleeve 28 at the forward position.

Referring to FIGS. 10-12, the collet assembly 26 is disposed within the interior space of the body 20 adjacent to the second end 34 thereof. The collet assembly 26 includes the plurality of individual collets 54 arranged in a circle around the longitudinal axis A-A. The collets 54 are configured so as to be movable radially during operation of the fluid connector 10 between an expanded position (FIG. 11) where the collets 54 define a first diameter and a collapsed position (FIG. 12) where the collets 54 define a second diameter that is less than the first diameter. The motion of the collets 54 is radial (inward or outward) only; the collets 54 do not pivot. The collets 54 are biased to the expanded position by the spring ring 56 that is disposed around the position piston 24 and disposed within the circumferential channel defined by the inner surfaces of the collets 54. The collets 54 are held within the interior space 36 of the body 20 by an inward flare 156 of the body 20.

Each of the collets 54 has the radial flange 62 extending therefrom. In addition, the washer 66 is disposed at the opposite sides of the collets 54 so that the collets 54 are axially fixed between the inward flare 156 and the washer 66, with the washer 66 contained within the inner diameter of the main seal piston 150. During operation of the fluid connector 10, the collets 54 are forced radially inward by the piston 22 from the expanded position in FIG. 11 to the collapsed position in FIG. 12. As best seen in FIG. 12, the collets 54 are at the collapsed position when the locking sleeve 28 is at the forward position.

Referring to FIGS. 11 and 12, the piston 22 is slidably disposed within the body 20 for sliding movement relative to the body 20 in directions parallel to the longitudinal axis A-A between the retracted position (FIG. 11) and the forward position (FIG. 12). The coil spring 70 or other biasing mechanism is engaged with the piston 22 and biases the piston 22 toward the forward position in FIG. 12. The first end 72 of the piston 22 is connectable to tubing or other structure of the first fluid system, and fluid flowing through the fluid connector 10 can flow from or into the tubing via the piston 22 and the position piston 24.

The piston 22 is generally hollow and has the second or front end 74, and a passage 76. The second end 74 includes the angled ramp surface 78 that is engageable with the collets 54 at the retracted position of the piston 22 shown in FIG. 11. At the retracted position of the piston 22, the collets 54 are at their expanded position. As the piston 22 is actuated toward the forward position in FIG. 12 (and the position piston 24 is moved out of the way as described further below), the ramp surface 78 engages the collets 54 forcing the collets 54 radially inward to their collapsed position and the second end 74 of the piston 22 is up and over the collets 54, surrounding the collets 54 to retain the collets 54 at the collapsed position and preventing the collets 54 from moving radially outward to return to the expanded position. So in the fluid connector 10, the collets 54 are actuated by the piston 22. In prior fluid connectors, the collets are encompassed by and actuated by either the sleeve or the body of the fluid connector.

The piston 22 further includes the detent groove 80 formed in the exterior surface thereof between the first end 72 and the second end 74, but in this embodiment positioned closer to the second end 74 than to the first end 72. The detent groove 80, which can be circumferentially continuous, is intended to receive radially inner ends of the locking balls 40 at the forward position of the piston 22 and the forward position of the locking sleeve 28 as illustrated in FIG. 12. In use of the fluid connector 10 as discussed further below, the radially outer ends of the locking balls 40 are retained by the locking sleeve 28 while the radially inner ends of the locking balls 40 sit within the detent groove 80 of the piston 22 (FIG. 12) at the connected state of the fluid connector 10.

With continued reference to FIGS. 11-12, the main seal piston 150 is generally cylindrical and is disposed within the piston 22 and is positioned between the piston 22 and the position piston 24. In this embodiment, the main seal piston 150 is a structure that is physically separate from the piston 22. However, the main seal piston 150 can be considered part of the piston 22. In this regard, as described further below, the main seal piston 150 performs some of the functions of the piston 22 described above in FIGS. 1-7 and 9.

The main seal piston 150 travels with the piston 22 between the retracted position (FIG. 11) and the forward position (FIG. 12) due to a shoulder 158 defined on the main seal piston 150 and a corresponding shoulder defined on the piston 22. The main seal piston 150 includes a first or rear end 160 and a second or front end 162. The first end 160 abuts against a snap ring 164 or the like that is fixed to the piston 22. In addition, a seal 166, such as an o-ring, seals between the main seal piston 150 and the piston 22.

With continued reference to FIGS. 11-12, the second end 162 of the main seal piston 150 receives the sealing assembly 82 therein. The sealing assembly 82 is disposed between the interior shoulder 84 which is in this embodiment is defined on the interior of the main seal piston 150 and the washer 66. In operation of the fluid connector 10, the sealing assembly 82 is designed to be squeezed between the washer 66 and the shoulder 84 as the main seal piston 150 together with the piston 22 move to their forward position in FIG. 12. Since the sealing assembly 82 is effectively encapsulated outwardly as well as axially, the sealing assembly 82 extrudes radially inwardly as it is being squeezed. This causes the sealing assembly 82 to seal with the outer diameter of the flared end 14 of the tube 12 as shown in FIG. 12 to prevent fluid leakage and limit radial inward extrusion of the sealing assembly 82. Because the sealing assembly 82 is encapsulated between the inner diameter of the main seal piston 150, the outer diameter of the flared end 14 of the tube 12, the washer 66 and the shoulder 84 of the main seal piston 150, extrusion of the sealing assembly 82 when being squeezed is limited, resulting in a consistent sealing force and longer life for the sealing assembly 82.

Figure 13:
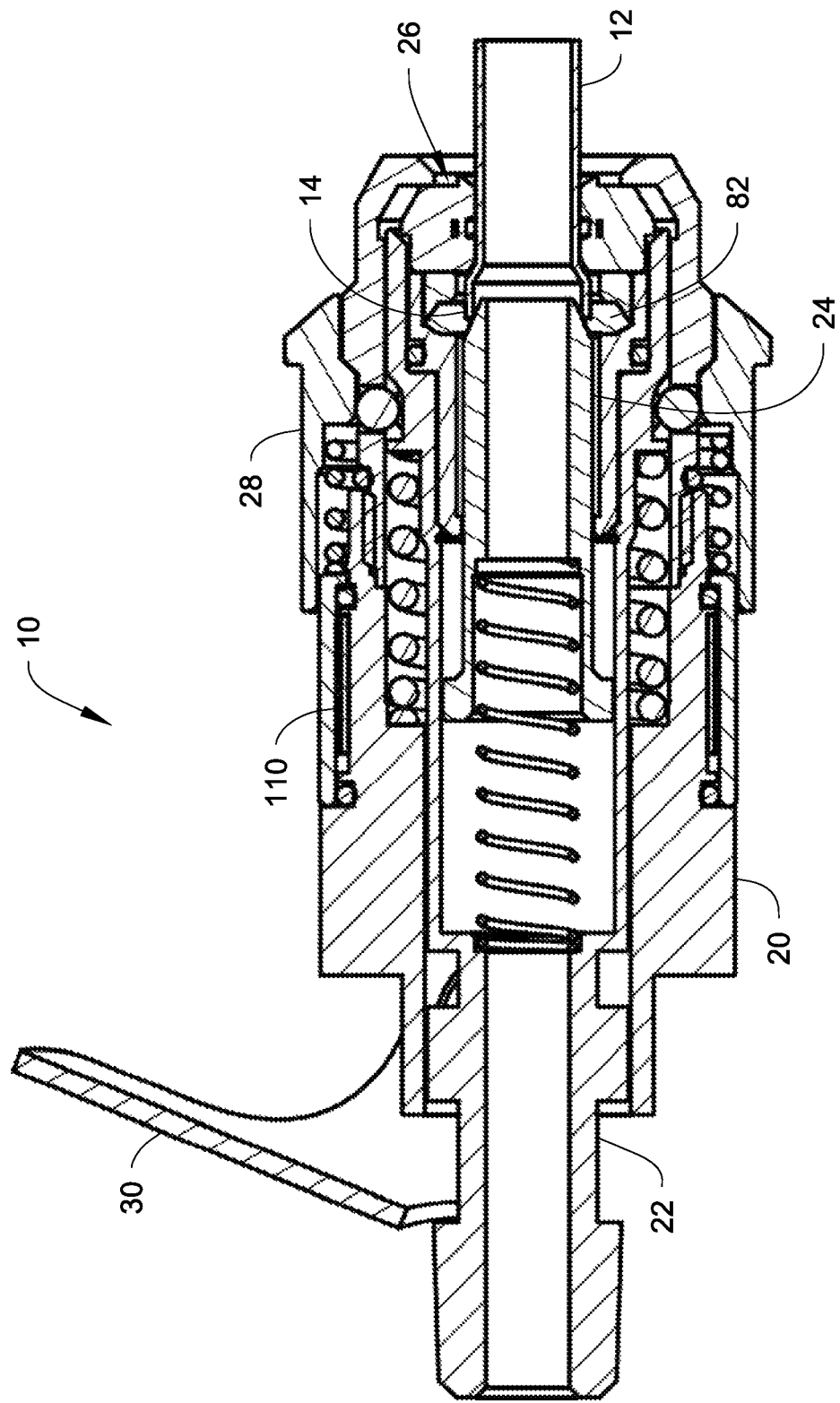
FIG. 13 is a view similar to FIG. 12 but with the flared end of the tube shorter than in FIGS. 10-12 so that the seal contacts the position piston so that the position piston limits radial inward extrusion of the seal.

The length of the flared end 14 of the tube 12 can vary greatly so that in some instances the seal assembly 82 may interface with the outer diameter of the position piston 24 while in other instances it may not. For example, in FIG. 12, the flared end 14 is relatively long so that the seal assembly 82 when squeezed engages only the outer diameter of the flared end 14 in the radial inward direction. FIG. 13 shows a quick connect fluid connector that is identical to the connector in FIGS. 10-12, but shows the flared end 14 of the tube 12 that is relatively shorter than in FIGS. 10-12 so that when squeezed the seal assembly 82 simultaneously engages the outer diameter of the flared end 14 and the end of the position piston 24, similar to the embodiment shown in FIG. 4.

The sealing assembly 82 can have any construction that allows it to perform the sealing functions described herein. In the embodiments illustrated in FIGS. 11-13, the sealing assembly 82 is illustrated as a single, unitary elastomeric element. However, in other embodiments, the sealing assembly 82 can be a pair of side-by-side elastomeric o-rings (as illustrated in FIGS. 3-5 and 7) where the o-rings are separate from one another or are integrated together into a unitary single-piece construction.

In the embodiments illustrated in FIGS. 10-13, actuation of the piston 22 by the handle 30 can be achieved in the same manner described above with respect to FIGS. 3-7 using the cam channel 86 and the actuation mechanism with cams (FIGS. 5-7) connected to the handle 30 for actuating the piston 22 between the retracted and forward positions thereof. The handle 30 is pivotally connected to the body 20 so that the handle 30 is pivotable relative to the body 20 between a disconnect position (shown in FIG. 11) and a connect position (shown in FIGS. 12 and 13). At the disconnect position of the handle 30, the piston 22 is in the retracted position, while the piston 22 is at the forward position when the handle 30 is at the connect position.

The position piston 24 controls the radial inward movement of the collets 54 which in turn controls movement of the piston 22 and the main seal piston 150 to the forward position which in turn controls radially inward movement of the locking balls 40 to permit the locking sleeve 28 to move to the forward position. The position piston 24 is slidably disposed within the main seal piston 150 and the position piston 24 is slidable relative to the main seal piston 150 parallel to the longitudinal axis A-A between a retracted position (FIGS. 12 and 13) and a forward position (FIG. 11). At the forward position of the position piston 24, the position piston 24 is within the collets 54 preventing movement of the collets 54 to the collapsed position. In order for the collets 54 to move radially inward to the collapsed position, the position piston 24 must be moved to the retracted position.

Referring to FIGS. 11-12 and FIG. 13, the coil spring 100 or other biasing mechanism is engaged with the position piston 24 and biases the position piston 24 toward the forward position in FIG. 11. The spring 100 has a front end engaged with a shoulder defined on the interior of the position piston 24, and a rear end engaged with an interior shoulder defined on the piston 22.

The position piston 24 has the fluid passageway 102 extending therethrough between the first end and the second end thereof. The second end of the position piston 24 is configured to engage with the flared end 14 of the tube 12 as shown in FIG. 12. In particular, the second end of the position piston 24 has a chamfer so that the flared end 14 can fit around the chamfered end of the position piston 24 as shown in FIGS. 12 and 13.

Operation of the fluid connector 10 in FIGS. 10-12 and FIG. 13 should be apparent from the description above. To connect to the tube 12, the flared end 14 of the tube 12 is inserted into the end of the fluid connector 10. This insertion will drive the position piston 24 back to the retracted position (FIGS. 12 and 13) which will allow the collets 54 to be driven radially inward to the collapsed position against the biasing force of the spring ring 56. The collets 54 are driven radially inward to the collapsed position via the main seal piston 150 and the piston 22 being actuated toward the forward position due to the biasing force of the spring 70. When the main seal piston 150 and the piston 22 reach the forward position, the detent groove 80 is disposed underneath the locking balls 40 which will allow the locking balls 40 to be driven radially inward. The locking balls 40 will be automatically driven radially inward by the ramp surface 50 on the locking sleeve 28 via the biasing force of the spring 42 acting on the locking sleeve 28. If the position piston 24 is not driven backward by the insertion of the tube 12, then the collets 54 cannot move radially inward, the main seal piston 150 and the piston 22 cannot move forward to the forward position, and the locking balls 40 will not move radially inward.

To disconnect the fluid connector 10 in FIGS. 10-12 and FIG. 13, a two-step process is required. First, the sleeve 28 must be pulled back from the position in FIGS. 12 and 13 so that the larger inner diameter portion of the sleeve 28 is above the locking balls 40. Then, the handle 30 is collapsed (i.e. rotated in a clockwise direction) from the position shown in FIGS. 12 and 13. When this happens, the cam actuation mechanism retracts the piston 22 together with the main seal piston 150 to the retracted position (FIG. 11). The spring ring 56 then expands the collets 54 to their expanded position releasing the flared end 14 of the tube 12.

In some embodiments, at least one radio frequency identification (RFID) tag 110 can optionally be incorporated into the fluid connector 10 of FIGS. 1-7, FIG. 9 and FIGS. 10-13. In one possible implementation, the RFID tag 110 can be used to verify that the fluid connector 10 is properly connected to the tube 12. In addition to or alternatively to connection verification, the RFID tag 110 can be used for purposes such as, but not limited to, identifying the fluid connector 10, ensuring that the correct fluid connector 10 is connected to the tube 12, counting the number of operation cycles of the fluid connector 10, tracking the fluid connector 10, tracking the working life of the fluid connector 10, and tracking maintenance intervals on the fluid connector 10.

FIGS. 3-4 illustrate one example embodiment of the RFID tag 110. The RFID tag 110 can be a passive RFID tag in that the RFID tag 110 does not have its own power source but is instead powered by the electromagnetic energy transmitted from an RFID reader. In another embodiment, the RFID tag 110 can be an active tag that is provided with its own power source or is electrically connected to a source of electrical power. A single one of the RFID tags 110 can be used, or a plurality of the RFID tags 110 can be provided. When used for connection verification, the RFID tag 110 is positioned on the body 20 (or elsewhere on the fluid connector 10) such that the RFID tag 110 is not detectable when a movable part of the fluid connector 10 is at a first position where the fluid connector 10 is not connected, but the RFID tag 110 is detectable when the movable part moves to a second position that is achieved only when the fluid connector 10 is properly connected.

For example, in the case of the RFID tag 110 being passive, the RFID tag 110 could be mounted at a location relative to the movable part such that the movable part, when at the first position, interferes with the RFID tag 110 receiving sufficient electromagnetic energy from a reader to prevent sufficient energizing of the RFID tag 110 and thereby preventing detection or sensing of the RFID tag 110, or the movable part interferes with a signal from the RFID tag 110 from reaching the reader. However, when the movable part moves to the second position, the RFID tag 110 can receive sufficient electromagnetic energy from a reader to sufficiently energize the RFID tag 110 and transmit a signal that can be sensed or detected by the reader, or the movable part no longer interferes with the signal from the RFID tag 110 from reaching the reader.

In the case of the RFID tag 110 being active, the RFID tag 110 could be mounted at a location such that the movable part blocks the signal from the RFID tag when the part is at the first position, but does not block the signal when the part is at the second position. Alternatively, movement of the part between the first and second positions could control the power source of the active RFID tag 110, such that power is shut off (or significantly reduced) when the part is at the first position so that no signal is transmitted, while power is supplied to the RFID tag 110 when the part is at the second position.

In one example implementation, the RFID tag 110 is positioned at a location on the body 20 near a metal part mounted on the body 20 that is movable relative to the body 20 between a first position and a second position, such that when the part is at the first position at least a portion of the RFID tag 110 is covered by the part, and when the part is at the second position no portion of the RFID tag 110 is covered. In particular, as shown in FIGS. 3-4, the RFID tag 110 is attached to an outer surface of the body 20 near the locking sleeve 28. The RFID tag 110 is closer to the first end 32 of the body 20 than to the second end 34 thereof. As shown in FIG. 3, at least a portion of the RFID tag 110 is covered by the locking sleeve 28 (which is made of metal) when the locking sleeve is at the retracted position, and as shown in FIG. 4 no portion of the RFID tag 110 is covered by the locking sleeve 28 when the locking sleeve 28 is at the forward position.

Similarly, in FIGS. 11-13, the RFID tag 110 is attached to an outer surface of the body 20 near the locking sleeve 28. As shown in FIG. 11, at least a portion of the RFID tag 110 is covered by the locking sleeve 28 (which is made of metal) when the locking sleeve is at the retracted position, and as shown in FIGS. 12 and 13 no portion of the RFID tag 110 is covered by the locking sleeve 28 when the locking sleeve 28 is at the forward position.

In the case of the RFID tag 110 being passive, Applicant has discovered that covering just a small portion of the RFID tag 110 with a metal structure, such as the locking sleeve 28 at the retracted position, can prevent sensing of the RFID tag 110 by an RFID reader. However, when the structure, such as the locking sleeve 28, no longer covers any portion of the RFID tag 110, sensing and reading of the RFID tag 110 can take place as implied by the symbols 112 in FIG. 4. This partial covering and uncovering of the RFID tag 110 could occur with any movable structure of the fluid connector 10. However, when used in conjunction with the locking sleeve 28, the RFID tag 110 can be used to verify the connection of the fluid connector 10 with the tube 12. In particular, if the locking sleeve 28 does not move fully forward to the connect position to uncover the RFID tag 110, sensing of the RFID tag 110 would not take place thereby indicating to the operator that connection has not been achieved. Therefore, if the position piston 24 is not driven backward by the insertion of the tube 12, then the collets 54 cannot move radially inward, the piston 22 (and the main seal piston 150 in FIGS. 11-13) cannot move forward, the locking balls 40 will not move downward, and the locking sleeve 28 will not move forward to uncover the RFID tag 110. However, if the connection verification function of the RFID tag 110 is not required, then the RFID tag 110 can be positioned at other locations on the fluid connector 10.

In the example illustrated in FIGS. 3-4, more than one RFID tag 110 is provided. In particular, depending upon the size of the RFID tag 110, enough of the RFID tags 110 are provided such than when arranged substantially end to end, the RFID tags 110 substantially encircle the outer surface of the body 20. In addition, a cap 114, for example made of plastic or other material that does not interfere with electromagnetic waves, can be provided over the RFID tag(s) 110 to protect the RFID tags 110. The cap 114 can be sealed with the outer surface of the body 20 by seals 116, 118.

Figure 8:
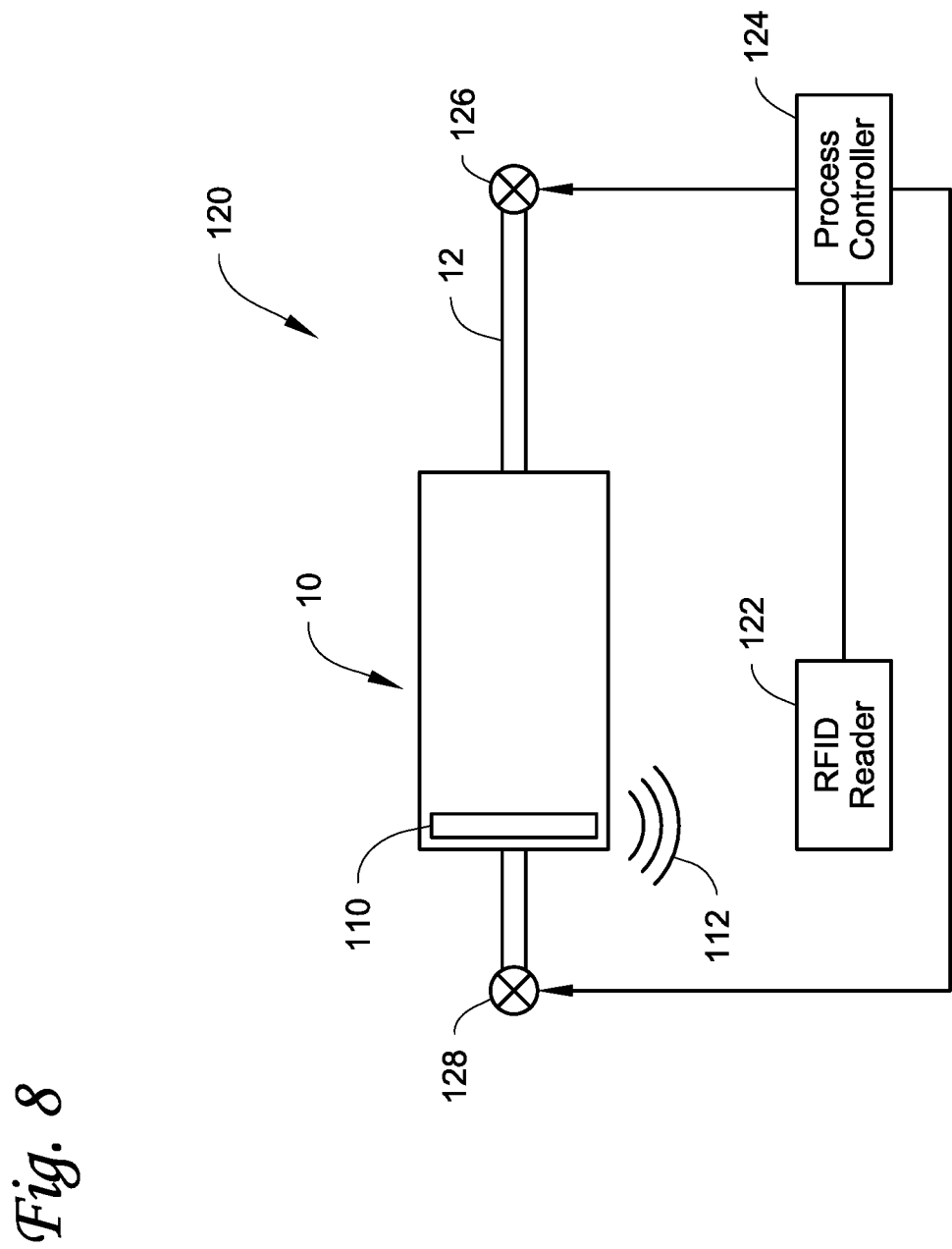
FIG. 8 illustrates a system incorporating the fluid connector described herein.

FIG. 8 illustrates a system 120 using the fluid connector 10 of FIGS. 1-7, FIG. 9 or FIGS. 10-13 and the RFID tag 110 for connection verification. The fluid connector 10 is illustrated as being connected to the tube 12. If the fluid connector 10 is properly connected, an RFID reader 122 will be able to sense or detect the RFID tag 110. If the RFID tag 110 is sensed/detected, a signal can be sent to a process controller 124 to indicate that the fluid connector 10 is connected and ready for use. The process controller 124, which is suitably interfaced with a valve 126 and/or with a valve 128, can then send a signal to the valve 126 and/or to the valve 128 to open the valve 126 and/or the valve 128 to allow flow of pressurized fluid into the fluid connector 10. In the instance where an operator does not properly connect the fluid connector 10 to the tube 12 so that the locking sleeve 28 covers at least a portion of the RFID tag 110, the RFID tag 110 is not sensed by the RFID reader 122, and the RFID reader 122 can send a signal to the process controller 124 to indicate that the fluid connector is not in the correct position and is not ready for use in the manufacturing process thus preventing the start of the manufacturing process. Similarly, if the RFID reader 122 previously sensed the RFID tag 110 and no longer senses the RFID tag 110, a signal can be sent to the process controller 124 to stop the flow of the fluid by closing the valve 126 and/or the valve 128.

As used herein (unless explicitly indicated to the contrary) sensing of the RFID tag 110 during connection verification refers to the RFID reader 122 being able to detect that the RFID tag 110 is present, regardless of whether or not data is read from or written to the RFID tag 110. Therefore, sensing the presence of the RFID tag 110 by the RFID reader 122, without reading data from or writing data to the RFID tag 110 may be sufficient to verify connection. If additional functionality beyond connection verification is desired, then reading of data from and/or writing of data to the RFID tag 110 can also take place.

The following tables lists additional interactions (whether sensing the RFID tag, reading data from the RFID tag, or writing data to the RFID tag) that can also take place and example benefits. The information in the tables assumes that the fluid connector 10 of FIGS. 1-7, FIG. 9 or FIGS. 10-13 is intended to be connected to an air conditioner moving along an assembly line during manufacture, assembly and testing of the air conditioner. It is to be realized that the fluid connector 10 can be used in other applications.

---

Write data to RFID tag (before connection to the air conditioner) on the date of creation of the fluid connector
Read a unique identifier from the RFID tag (before connection to the air conditioner) such as a code or serial number of the fluid connector for tracking the fluid connector
Read data from the RFID tag upon connector to the air conditioner to match that fluid connector to the air conditioner
Write data to the RFID tag upon attachment of the fluid connector to the air conditioner, for example cycle counting and increment cycle count of the fluid connector that is stored in the RFID tag by one
Sense the RFID tag and/or read data from the RFID tag at a pressure bell/burst station for safety purposes to ensure that the fluid connector is properly connected and safe to use prior to pressure/burst testing and/or to ensure that the fluid connector is the correct connector for the pressure/burst testing
Sense the RFID tag and/or read data from the RFID tag at a refrigerant charging/filling station for safety purposes to ensure that the fluid connector is properly connected and safe to use prior to initiating the flow of refrigerant and/or to ensure that the fluid connector is the correct connector for the refrigerant charging/filling station
Sense the RFID tag at each air conditioner assembly stage for purposes of cycle counting by determining how long each stage takes
Read data from the RFID tag at the end of the air condition assembly steps for purposes of tracking the fluid connector by checking in the connector to ensure the connector is not left on the air conditioner or is lost
Read data from the RFID tag during the air condition assembly steps for purposes of maintenance to uniquely identify problem fluid connector for maintenance at site of occurrence
Read data from the RFID tag at a maintenance facility for the fluid connector to uniquely identify the fluid connector and its maintenance intervals
Write data to the RFID tag at a maintenance facility for the fluid connector to indicate when the fluid connector was serviced

---

The RFID tag 110 described herein not only acts as a sensor to indicate correct attachment of the fluid connector 10, but also provides a way to uniquely identify the fluid connector 10. The RFID tag 110 can be passive and not require its own power source, or the RFID tag 110 can be active and have its own power source or be connected to a power source. Erroneous reading of the RFID tag 110 prior to proper connection of the fluid connector 10 is prevented by the position piston 24 and locking the sleeve 28 into a position where the RFID tag 110 cannot be sensed or read. The flared end 14 of the tube 12 must be inserted into the fluid connector 10 in order to actuate the fluid connector 10 correctly. The seal assembly 82 is positioned to seal with the flared end 14 of the tube 12 and ensures a successful seal between the fluid connector 10 and the tube 12 at wider tube tolerances.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A quick connect fluid connector that is detachably connectable to a tube of a fluid system to process a fluid into or from the fluid system through the quick connect fluid connector, comprising:
 a generally cylindrical construction that includes a body, a piston surrounded by the body, a collet assembly with a plurality of collets, a locking sleeve that surrounds the body and the piston, and a longitudinal axis;
 the collet assembly is disposed within the body adjacent to an end thereof, the plurality of collets of the collet assembly are radially movable between an expanded position and a collapsed position radially inward from the expanded position;
 the piston is slidably disposed within the body for sliding movement parallel to the longitudinal axis between a retracted position and a forward position, a spring is engaged with the piston and biases the piston toward the forward position of the piston, and the piston and the plurality of collets are arranged relative to one another so that the piston actuates the plurality of collets to the collapsed position as the piston moves from the retracted position to the forward position; and
 wherein the piston and the plurality of collets are arranged such that at the retracted position of the piston, the plurality of collets are at the expanded position, and at the forward position of the piston an end of the piston surrounds the plurality of collets and the plurality of collets are at the collapsed position.

2. The quick connect fluid connector of claim 1, further comprising a position piston slidably disposed within the piston, the position piston is slidable parallel to the longitudinal axis relative to the piston between a retracted position and a forward position, a spring is engaged with the position piston and biases the position piston toward the forward position thereof;
 a seal within an interior space of the piston adjacent to the end thereof;
 a washer disposed between the seal and the plurality of collets;

wherein at the forward position of the piston and at the retracted position of the position piston and with the quick connect fluid connector connected to the tube, the seal is encapsulated at a radially inner side thereof by the tube, at a radially outer side thereof by the piston, at a first axial end thereof by the piston and at a second axial end thereof by the washer.

3. The quick connect fluid connector of claim 2, wherein the piston includes a main seal piston, and the seal is encapsulated at the radially outer side thereof by the main seal piston, and at the first axial end by the main seal piston.

4. A quick connect fluid connector that is detachably connectable to a tube of a fluid system to process a fluid into or from the fluid system through the quick connect fluid connector, comprising:
a generally cylindrical construction that includes a body, a piston surrounded by the body, a position piston surrounded by the piston, a collet assembly with a plurality of collets, a locking sleeve that surrounds the body and the piston, and a longitudinal axis;
the piston is slidably disposed within the body for sliding movement parallel to the longitudinal axis between a retracted position and a forward position, a spring is engaged with the piston and biases the piston toward the forward position of the piston;
the position piston is slidably disposed within the piston and the position piston is slidable parallel to the longitudinal axis relative to the piston between a retracted position and a forward position, a spring is engaged with the position piston and biases the position piston toward the forward position thereof;
a seal within an interior space of the piston adjacent to an end thereof;
wherein the seal surrounds the position piston at the forward position thereof, and the seal contacts the position piston at the retracted position thereof whereby the position piston limits radial inward extrusion of the seal.

5. The quick connect fluid connector of claim 4, further comprising a washer disposed between the seal and the plurality of collets;
wherein at the retracted position of the piston and at the retracted position of the position piston and with the quick connect fluid connector connected to the tube, the seal is encapsulated at a radially inner side thereof by the position piston and the tube, at a radially outer side thereof by the piston, at one axial side thereof by the piston and at a second axial side thereof by the washer.

6. The quick connect fluid connector of claim 4, further comprising a plurality of locking balls on the body, the piston includes an outer surface with a detent groove that can receive the locking balls;
wherein when the piston is at the retracted position thereof, the locking balls are not disposed within the detent groove of the piston; and
wherein when the piston is at the forward position thereof, the locking balls are disposed within the detent groove of the piston.

7. The quick connect fluid connector of claim 4, wherein at the forward position of the position piston: an end of the position piston extends beyond the seal and the end of the position piston extends beyond the end of the piston.

8. The quick connect fluid connector of claim 4, further comprising at least one radio frequency identification tag attached to an outer surface of the body;
wherein the radio frequency identification tag is positioned at a location on the outer surface of the body such that at least a portion of the radio frequency identification tag is covered by the locking sleeve when the locking sleeve is at a retracted position thereof, and no portion of the radio frequency identification tag is covered by the locking sleeve when the locking sleeve is at a forward position thereof.

9. The quick connect fluid connector of claim 4, wherein the piston includes a main seal piston.

10. A quick connect fluid connector that is detachably connectable to a tube of a fluid system to process a fluid into or from the fluid system through the quick connect fluid connector, comprising:
a generally cylindrical construction that includes a body;
a metal part mounted on the body and movable relative to the body between a first position and a second position;
at least one radio frequency identification tag attached to an outer surface of the body configured to verify connection of the quick connect fluid connector with the tube;
wherein the radio frequency identification tag is positioned at a location on the outer surface of the body such that at least a portion of the radio frequency identification tag is covered by the metal part when the metal part is at the first position, wherein when the metal part is at the first position a signal from the radio frequency identification tag is blocked to prevent sensing of the radio frequency identification tag thereby indicating that the quick connect fluid connector is not connected with the tube, and no portion of the radio frequency identification tag is covered by the metal part when the metal part is at the second position, wherein when the metal part is at the second position, a signal from the radio frequency identification tag is not blocked to allow sensing of the radio frequency identification tag thereby indicating that the quick connect fluid connector is connected with the tube.

11. The quick connect fluid connector of claim 10, wherein the radio frequency identification tag is a passive radio frequency identification tag or an active radio frequency identification tag.

12. The quick connect fluid connector of claim 10, wherein the quick connect fluid connector is in a disconnected state when the metal part is at the first position, and the quick connect fluid connector is in a connected state when the metal part is at the second position; the radio frequency identification tag cannot be detected by an electronic reader when the metal part is at the first position, and the radio frequency identification tag can be detected by the electronic reader when the metal part is at the second position.

* * * * *